Oct. 23, 1934.  C. W. SINCLAIR  1,977,701

WHEEL AND METHOD OF MAKING THE SAME

Filed Aug. 17, 1931  3 Sheets-Sheet 1

INVENTOR
Charles W. Sinclair
BY
ATTORNEY

Oct. 23, 1934.    C. W. SINCLAIR    1,977,701
WHEEL AND METHOD OF MAKING THE SAME
Filed Aug. 17, 1931    3 Sheets-Sheet 2
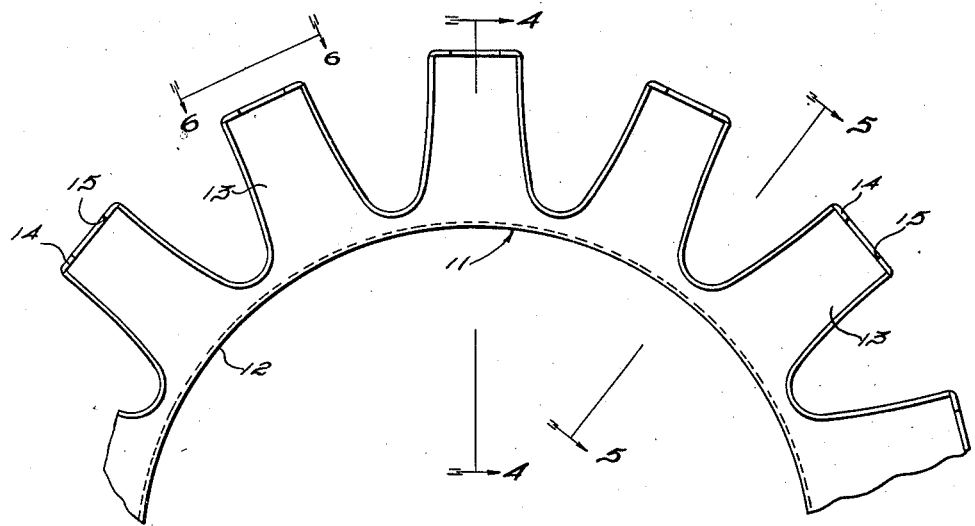
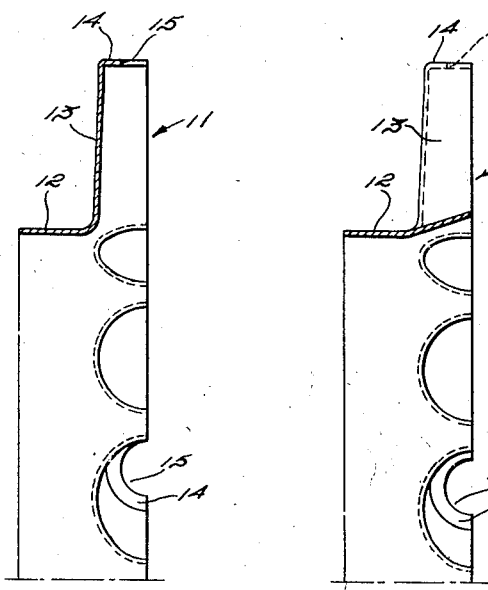
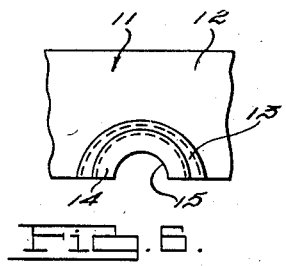
INVENTOR
Charles W. Sinclair
BY
ATTORNEY Oct. 23, 1934.  C. W. SINCLAIR  1,977,701
WHEEL AND METHOD OF MAKING THE SAME
Filed Aug. 17, 1931   3 Sheets-Sheet 3
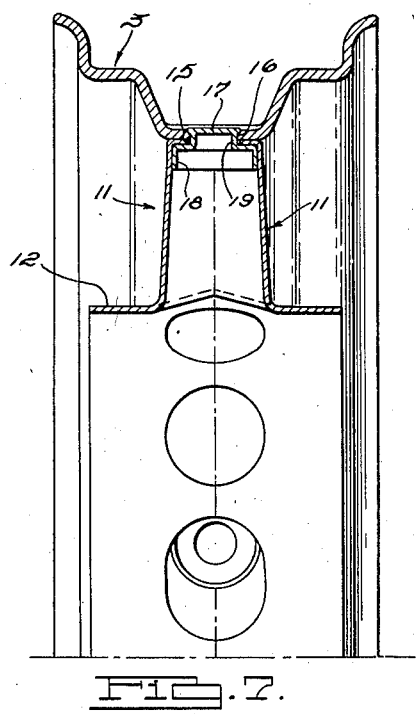
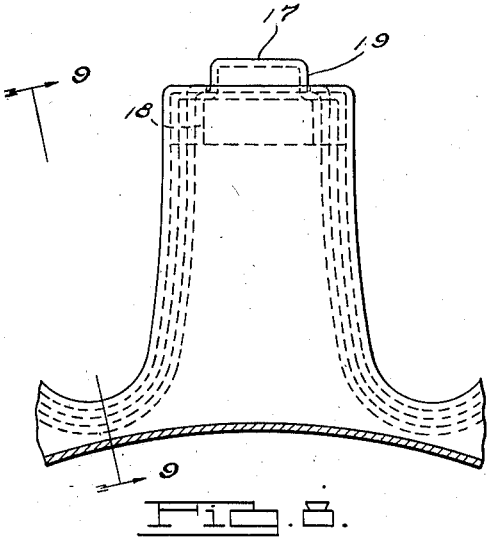
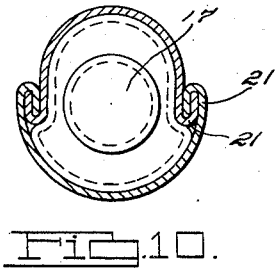
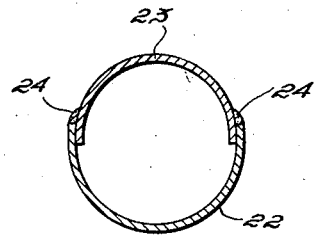
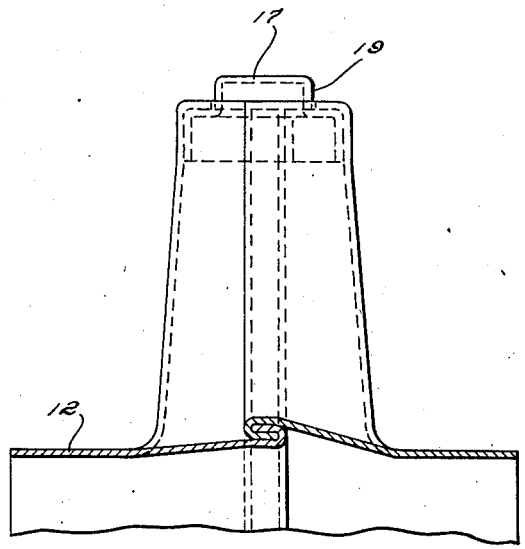
INVENTOR
Charles W. Sinclair.
BY
ATTORNEY Patented Oct. 23, 1934

1,977,701

UNITED STATES PATENT OFFICE 1,977,701

WHEEL AND METHOD OF MAKING THE SAME

Charles W. Sinclair, Detroit, Mich., assignor to Kelsey-Hayes Wheel Corporation, Detroit, Mich., a corporation of New York Application August 17, 1931, Serial No. 557,713

7 Claims. (Cl. 29—159.03)

The invention relates to wheels and the method of making the same and has for some of its objects to provide a construction of wheel which is strong and durable and of relatively light weight; to provide a construction of wheel the parts of which may be readily stamped, drawn or rolled; and to provide a construction of wheel the parts of which are so arranged that they may be economically assembled. Another object is to provide an improved method of making the wheel economically by forming the wheel body of cooperating sections and securing these sections together prior to their assembly with the hub member.

These and other objects of the invention will become apparent from the following description, taken in connection with the accompanying drawings, in which Figure 1 is a front elevation of a portion of a wheel showing an embodiment of my invention;

Figure 3 is a front elevation of one of the wheel body sections;

Figures 4, 5 and 6 are cross sections on the lines 4—4, 5—5 and 6—6 of Figure 3;

Figure 7 is a section through the wheel body and rim assembly;

Figures 8, 9 and 10 illustrate another embodiment of my invention;

Figure 11 illustrates another embodiment of my invention.

Figure 1:
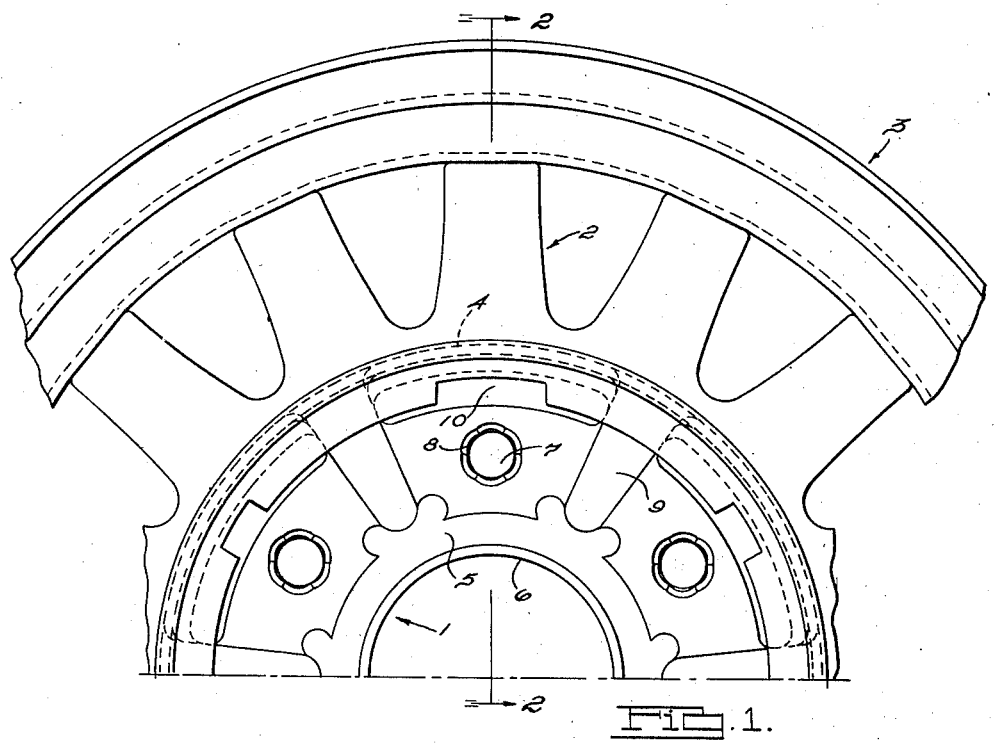
Figure 2:
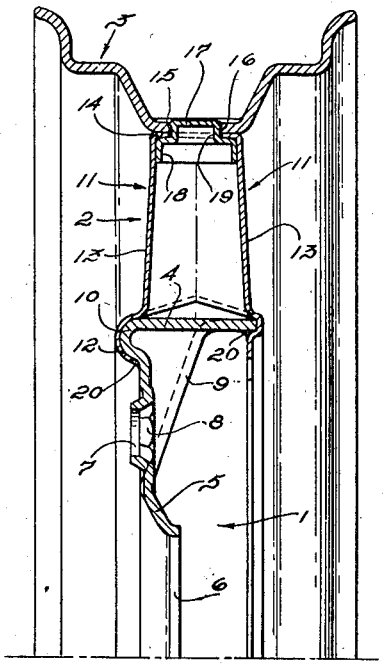
Figure 2 is a cross section on the line 2—2 of Figure 1.

The wheel shown in Figures 1 and 2 and embodying my invention is designed particularly for use with motor vehicles and comprises the hub member 1, the wheel body 2 and the rim member 3. The hub member is preferably formed of sheet metal and stamped or drawn to shape and it comprises the axially extending annular flange 4 and the radially extending flange 5, which latter forms the mounting or anchoring portion for the wheel. The flange 5 is formed with the central or axial opening 6 for sleeving over the inner hub and with the annular series of openings 7 for receiving the means, such as bolts or bolts and nuts, for securing the wheel to the inner hub. The faces 8 surrounding these openings are preferably corrugated to cooperate with corresponding faces upon the heads of the bolts or upon the nuts to lock the bolts or nuts from accidental disengagement. For reinforcing the hub member, I have provided the radially extending hollow ribs or beads 9 merging into the flanges 4 and 5 and the annular hollow rib or bead 10 at the junction between these flanges and interrupted by the ribs or beads 9.

The wheel body 2 is formed of the cooperating sheet metal sections 11, which are stamped or drawn to shape. Each of these sections has the central annular portion 12 and the radiating U-shaped or approximately semi-circular spoke forming portions 13, which latter have at their outer ends the transverse flanges 14 providing the semi-circular openings 15. The sections 11 face each other and are fixedly secured together by securing the edges of the channel-shaped spoke forming portions 13 to each other and by securing the edges of the central portions 12 to each other. The spoke forming portions 13 cooperate to form hollow spokes. The central portion 12 of the front section 11 is crimped around the front edge of the annular flange 4 of the hub member and fixedly secured thereto and the central portion 12 of the rear section 11 is crimped around the hollow rib or bead 10 and fixedly secured thereto.

The rim member 3, as substantially shown, is a tire carrying rim of the drop-center type and it is formed of sheet metal and may be rolled to shape and suitably sized. For securing this rim to the wheel body, I have provided in the base of the well of the rim the radially extending openings 16 and I have provided the caps 17, each of which has the enlarged portion 18 and the reduced portion 19, there being one cap for each spoke. Each cap has its enlarged portion within the outer end of a spoke and abutting the transverse flanges 14 of the spoke forming portions forming the spoke. The reduced portion 19 extends through the circular opening formed by the cooperating semi-circular openings 15 and through the opening 16 and this reduced portion is welded, peened or riveted over against the outer face of the base of the well, which is preferably countersunk so that the outer face of each cap is substantially flush with the outer face of the well.

In making the wheel, I provide the sheet metal hub and rim members 1 and 3 respectively and also the cap members 17, which are preferably formed of sheet metal and stamped or drawn to shape. I also provide the front and rear wheel body sections 11, as shown more in detail in Figures 3, 4, 5 and 6, by stamping or drawing the same from a sheet metal blank, each section having the central annular portion 12 and the radiating U-shaped spoke forming portions 13 integral therewith, each spoke forming portion having at its outer end the transverse flange 14 forming the semi-circular opening 15. The central portion 12 of each section is formed to extend transversely or axially. The front and rear sections are assembled to face each other with the spoke forming portions 13 of one section cooperating with the spoke forming portions 13 of the other section to form hollow spokes and with the central portions 12 of the front and rear sections extending away from each other. These sections are then fixedly secured together by suitable means as, for example, by butt-welding the edges of the sections together, which can be readily accomplished inasmuch as the central portions of the sections, including the inner ends of the spokes, are open. After the wheel body sections have been fixedly secured together, the rim 3 is then secured upon the outer ends of the spokes by inserting the caps 17 within the spokes and holding the same against the spoke flanges 14, while welding, peening over or riveting the reduced portions of these caps against the outer face of the base of the well of the rim. Since the central portions and the inner ends of the spokes are open while the rim is being secured in place, it will be seen that this operation is also greatly facilitated. Prior to assembling the rim upon the spokes the rim is preferably expanded by heating the same and after assembling the rim is forcibly shrunk upon the spokes by a suitable operation, such as a bulldozer, after which the rim is allowed to shrink further by cooling. As a result the rim tightly engages the ends of the spokes. The assembly of the wheel body and the rim, as thus far completed, is shown particularly in Figure 7.

The wheel body and rim assembly is then assembled with the hub member 1 by inserting the hub member therewithin with the annular flange 4 of the hub member extending across the inner ends of the spokes and closing the same. The central portions 12 of the wheel body sections are then crimped over the outer edge of the annular flange 4 and the hollow rib or bead 10 and are fixedly secured to the hub member by suitable means, such as the welds 20.

As illustrated in Figures 8, 9 and 10, the wheel body sections may be fixedly secured together as by crimping their edges, the edges of both sections being formed with inter-fitting return bends 21. Aside from this difference, the method of assembling is the same as that previously described. In this wheel construction, the front wheel body section extends over the rear wheel body section so that the crimping is concealed from the front side of the wheel.

Figure 11 illustrates another manner of securing the front and rear sections of the wheel body together. In this construction the front section 22 overlaps the rear section 23 and the overlapping portions are secured together by the welds 24.

What I claim as my invention is:

1. The method of making a wheel, which comprises providing wheel body sections each having U-shaped spoke forming portions, providing caps and a rim member apertured to receive the caps, securing the sections together to form the wheel body with the spoke forming portions of one section cooperating with the spoke forming portions of the other section to form hollow spokes, inserting the caps within the hollow spokes and projecting beyond their outer ends, expanding the rim member by heating the same, assembling the rim member while expanded with the spokes and caps, shrinking the rim member upon the outer ends of the spokes and with the caps projecting into the apertures in the rim member and fixedly securing the caps to the rim member.

2. Those steps in the method of making a wheel which consist in providing a mounting member having an axially extending annular portion, fashioning a sheet metal blank to form an annular wheel body section having radially extending spoke forming portions and having an axially extending annular central portion, shaping another blank to form a similar section, uniting the sections together to form a wheel body with the spoke forming portions of one section cooperating with the spoke forming portions of the other section to form spokes and with the axially extending annular central portions thereof coextensive, assembling the wheel body thus formed upon the mounting member with the annular portion of the latter closing the inner ends of the spokes, and crimping the axially extending central portions of the wheel body sections around opposite ends of the annular portion of the mounting member.

3. In a wheel, the combination with a hub member having an axially extending flange, of a wheel body mounted upon said hub member and comprising front and rear sections, each having a central annular portion and radiating spoke forming portions, said spoke forming portions cooperating with each other to form hollow spokes and said central portions being crimped over opposite ends of the annular flange on the hub member to secure the same in assembled relation with the wheel body.

4. Those steps in the method of making a wheel which consist in fashioning a wheel body with radially outwardly extending hollow spokes open at the inner ends thereof, inserting cap members into the spokes from the inner ends thereof, securing the cap members in the spokes with the outer ends projecting beyond the corresponding ends of the spokes, positioning a rim member having openings in the base thereof around the spokes with the projecting ends of the cap members extending through the openings, and securing said projecting ends of the cap to the rim member.

5. Those steps in the method of making a wheel which consist in fashioning a wheel body with radially outwardly extending hollow spokes open at the inner ends thereof, inserting a cap member into each of the spokes from the inner ends of the latter, securing the cap members in the outer ends of the spokes with a portion of said members projecting beyond the outer ends of said spokes, encircling the projecting ends of the cap members with a rim having openings in the base thereof registrable with the cap members, and shrinking the rim to extend the said projecting ends of the cap members through the openings in the base of the rim.

6. Those steps in the method of making a wheel which consist in fashioning sheet metal to form a wheel body with hollow radially extending spokes open at the inner ends and having reduced openings through the outer ends providing shoulders, inserting a cap member having a reduced outwardly extending portion into each of the spokes through the inner ends thereof, securing the cap members in the outer ends of the spokes with the reduced portions of the cap members extending through the openings in the outer ends of the spokes and with the shoulders on the latter engaging the surfaces of said members surrounding the reduced portions thereof, and securing the cap to said rim member.

7. Those steps in the method of making a wheel which consist in fashioning a sheet metal blank to form an annular wheel body section having radially extending spoke forming portions and having an axially extending annular central portion, shaping another blank to form a similar section, uniting the sections together to form a wheel body with the spoke forming portions of one section cooperating with the spoke forming portions of the other section to form hollow spokes and with the axially extending annular central portions thereof coextensive, inserting a cap member into each of the hollow spokes through the open inner ends thereof, securing the cap members into the outer ends of the spokes with the outer ends of said members projecting beyond the corresponding ends of said spokes, closing the inner ends of the spokes with a wheel mounting member by sleeving said member into the coextensive central portions of the wheel body, crimping said central portions over the mounting member to secure the latter to the wheel body, and securing a rim member to the outwardly projecting portions of the cap members.

CHARLES W. SINCLAIR.